No. 793,093. PATENTED JUNE 27, 1905.
H. C. PORTER.
BATTERY GRID.
APPLICATION FILED AUG. 19, 1904.
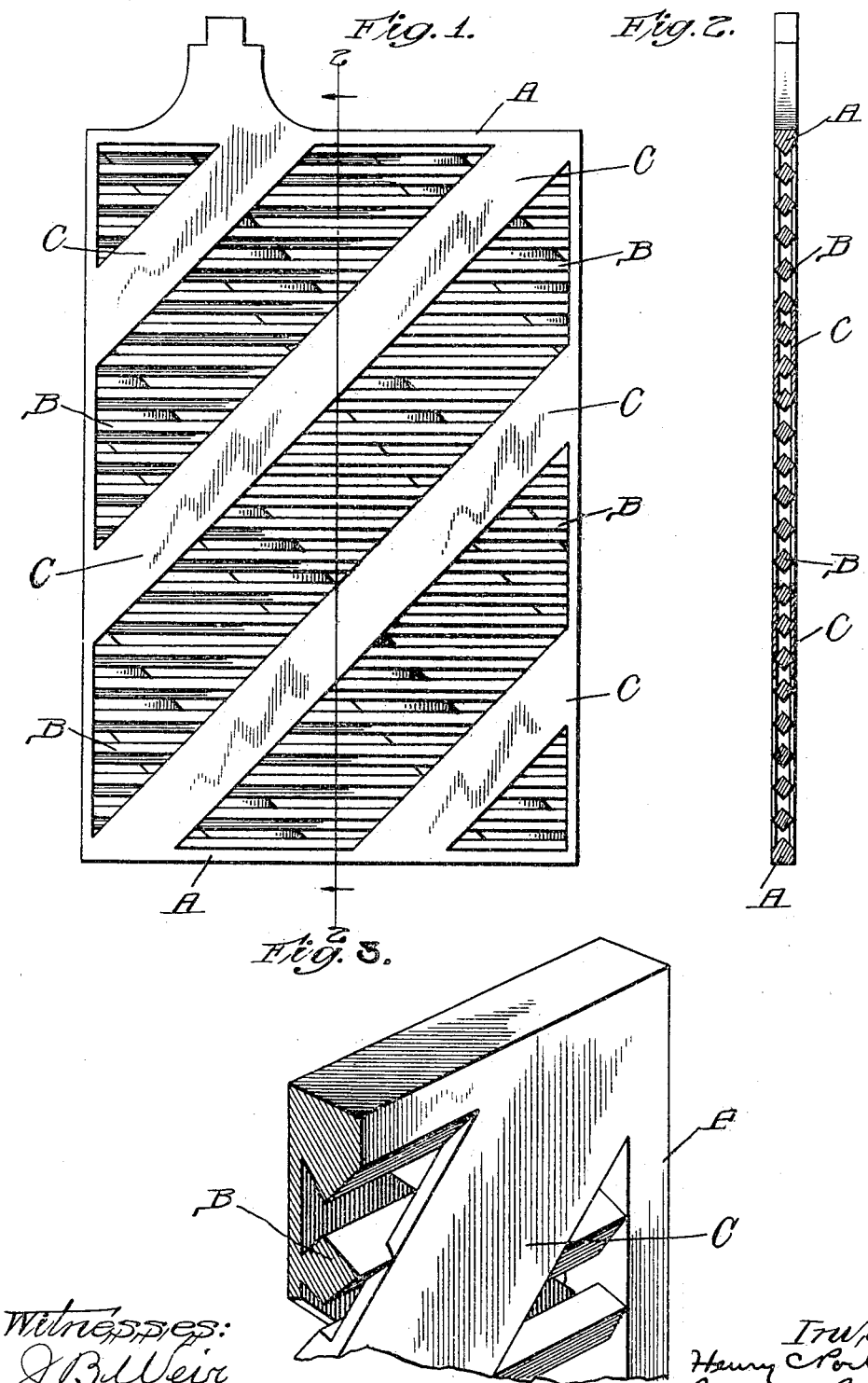

No. 793,093.

Patented June 27, 1905.

UNITED STATES PATENT OFFICE.

HENRY C. PORTER, OF WAUKEGAN, ILLINOIS, ASSIGNOR TO VESTA ACCUMULATOR COMPANY, OF CHICAGO, ILLINOIS, A CORPORATION OF ILLINOIS.

BATTERY-GRID.

SPECIFICATION forming part of Letters Patent No. 793,093, dated June 27, 1905.

Application filed August 19, 1904. Serial No. 221,365.

*To all whom it may concern:*

Be it known that I, HENRY C. PORTER, a citizen of the United States, residing at Waukegan, in the county of Lake and State of Illinois, have invented certain new and useful Improvements in Battery-Grids, of which the following is a specification.

My invention relates to that particular type of electrical secondary or storage battery plates which are designated as the "Faure" or "pasted-plate" type. In storage batteries of this type much difficulty is encountered in providing means for holding the active material in constant intimate contact with the plate or grid. In charging and discharging, the plate, with its mechanically-applied material, is subjected to marked expansion and contraction, and the metallic grid often warps or buckles, which tends to disintegrate the material and dislodge it from the support. This also causes the dislodged active material to accumulate upon the bottom of the cell and produces short-circuiting. In retaining the active material in place it is also essential to provide free circulation for the electrolyte to attack and act upon the active material. The cause of the warping or buckling of the grid is primarily the formation of a sulfate in the plugs of active material, which fill the spaces between the parts of the grid and which causes the plugs to expand. As lead has little elasticity the grid is forced out of shape. As usually constructed the edges of the grid are heavier than the intermediate portion, so the effect of this distortion is to bulge the plate in the center.

My invention has for one object the provision of means whereby the active material or material to become active shall be firmly secured and held against dislodgment in the electrode under the influence of the charge and discharge and also to provide means for the free circulation of the electrolyte in and around the outer and subjacent exposed surfaces of the material.

A further object of my invention is to provide a plate so reinforced as to meet the requirements of heavy service, such as upon trucks, &c.

A further object of my invention is the prevention of buckling of the plate, which is a frequent source of short-circuiting and consequent loss of electromotive force.

My invention is adapted to be used either as a positive or negative plate.

These and such other objects as may hereinafter appear are attained by the devices shown in the accompanying drawings, in which—

Figure 1 is an elevation of a grid of my improved type. Fig. 2 is a sectional view of Fig. 1 on the line 2 2 looking in the direction indicated by the arrows, and Fig. 3 is an enlarged perspective of one corner of Fig. 1.

Like letters of reference indicate the same parts in the several figures of the drawings.

Referring by letter to the accompanying drawings, A represents the body of the grid, which constitutes the support for the active material. This grid, which is shown as constructed with solid edges, comprises a series of interior horizontal bars B, which, while they may be of any desired shape, are here shown as rectangular and so placed that the diagonals of a cross-section will be horizontal and vertical lines when the grid is in place. Extending across these bars and integral therewith are a series of strips C of the same material. These strips extend across both sides of the grid and are preferably run diagonally in opposite directions. By this construction the grid is greatly stiffened, and all danger of buckling or warping is removed. The unions between the bars and the strips form a series of pockets that serve to key or lock the active material in place in a sufficient degree, while the configuration of the parts is such as to accommodate a large amount of active material and to accommodate in itself any expansion of material caused by the formation of sulfate or from any other cause without injuring the plate. This preferred form of my grid is easily and cheaply constructed and, owing to its construction, can be kept continually in use for a long period.

While I have illustrated one embodiment of my invention, it is evident that other constructions are possible without departing from the spirit of my invention.

I claim—

1. A battery plate or grid comprising a frame, a series of centrally-disposed longitudinal bars connected integrally with the end bars of the frame, and series of diagonal strips connected integrally with the outer bars and also with the longitudinal bars.

2. A battery plate or grid comprising a frame, a series of centrally-disposed longitudinal bars connected integrally with the end bars of the frame, and series of diagonal strips on both sides of the grid and connected integrally with the outer bars and also with the longitudinal bars.

3. A battery plate or grid comprising a frame, a series of centrally-disposed longitudinal bars connected integrally with the end bars of the frame, and series of diagonal strips on both sides of the grid, extending in opposite directions to each other and connected integrally with the outer bars and also with the longitudinal bars.

4. A battery plate or grid comprising a frame, a series of centrally-disposed longitudinal bars of rectangular cross-section connected integrally with the end bars of the frame, and series of diagonal strips connected integrally with the outer bars and also with the longitudinal bars.

5. A battery plate or grid comprising a frame, a series of centrally-disposed longitudinal bars of rectangular cross-section so placed as to present angles at their upper and lower edges and connected integrally with the end bars of the frame, and series of diagonal strips connected integrally with the outer bars and also with the longitudinal bars.

6. A battery plate or grid comprising a frame, a series of centrally-disposed longitudinal bars connected integrally with the end bars of the frame, series of diagonal strips connected integrally with the outer bars and also with the longitudinal bars, and a series of pockets formed between said bars and said strips.

7. A battery plate or grid comprising a rectangular frame, a series of centrally-disposed longitudinal bars, connected integrally with the end bars of the frame, and series of diagonal strips on both sides of the grid, extending in opposite directions to each other and connected integrally with the outer bars and also with the longitudinal bars.

8. A battery plate or grid comprising a rectangular frame, a series of centrally-disposed longitudinal bars of rectangular cross-section so placed as to present angles at their upper and lower edges and connected integrally with the end bars of the frame, and series of diagonal strips connected integrally with the outer bars and also with the longitudinal bars.

HENRY C. PORTER.

Witnesses:
F. H. DRURY,
O. R. BARNETT.